US012158715B2

(12) United States Patent
Kohama

(10) Patent No.: US 12,158,715 B2
(45) Date of Patent: Dec. 3, 2024

(54) FIXING DEVICE CAPABLE OF SUPPRESSING CURRENT THAT FLOWS WHEN HEATING OF FIXING MEMBER IS STARTED, IMAGE FORMING APPARATUS, AND POWER SUPPLY

(71) Applicant: KYOCERA Document Solutions Inc., Osaka (JP)

(72) Inventor: Atsushi Kohama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/298,198

(22) Filed: Apr. 10, 2023

(65) Prior Publication Data

US 2023/0324837 A1 Oct. 12, 2023

(30) Foreign Application Priority Data

Apr. 11, 2022 (JP) ................................ 2022-064982

(51) Int. Cl.
*G03G 15/20* (2006.01)
*G03G 15/00* (2006.01)

(52) U.S. Cl.
CPC ......... *G03G 15/2039* (2013.01); *G03G 15/80* (2013.01)

(58) Field of Classification Search
USPC .......................................................... 399/69
See application file for complete search history.

(56) References Cited

U.S. PATENT DOCUMENTS

2003/0155349 A1* 8/2003 Matsuo .................... H05B 6/06 219/664
2007/0189795 A1* 8/2007 Chae ................. G03G 15/2039 399/69
2012/0155895 A1* 6/2012 Shimura ........... G03G 15/2039 399/33
2013/0142535 A1* 6/2013 Jeong ................ G03G 15/2039 399/69

FOREIGN PATENT DOCUMENTS

JP 10301442 A * 11/1998
JP 2009265387 A 11/2009
JP 2017011900 A * 1/2017 ......... G03G 15/2039

* cited by examiner

*Primary Examiner* — Quana Grainger
(74) *Attorney, Agent, or Firm* — Alleman Hall & Tuttle LLP

(57) ABSTRACT

A fixing device includes a fixing member, a resistance heating element, and a power supply control portion. The fixing member fixes a toner image transferred onto a sheet. The resistance heating element is used for heating the fixing member, and an electrical resistance thereof increases as a temperature increases. The power supply control portion gradually increases, when a heating timing of the fixing member arrives, input power to be input to the resistance heating element toward a predetermined upper limit value.

6 Claims, 8 Drawing Sheets

FIXING DEVICE CAPABLE OF SUPPRESSING CURRENT THAT FLOWS WHEN HEATING OF FIXING MEMBER IS STARTED, IMAGE FORMING APPARATUS, AND POWER SUPPLY

INCORPORATION BY REFERENCE

This application is based upon and claims the benefit of priority from the corresponding Japanese Patent Application No. 2022-064982 filed on Apr. 11, 2022, the entire contents of which are incorporated herein by reference.

BACKGROUND

The present disclosure relates to a fixing device, an image forming apparatus, and a power supply control method.

An image forming apparatus capable of forming an image using electrophotography includes a fixing device which fixes a toner image transferred onto a sheet, onto the sheet. As one type of the fixing device, there is known a fixing device which heats a fixing member such as a fixing belt using a resistance heating element in which an electrical resistance increases as a temperature increases.

In the fixing device including the resistance heating element, a large current may flow at a time of a start of heating of the fixing member due to a small electrical resistance of the resistance heating element in a case where the resistance heating element is at room temperature. In contrast, a fixing device which heats the resistance heating element before power supply to the resistance heating element is started is known as a related art.

SUMMARY

A fixing device according to an aspect of the present disclosure includes a fixing member, a resistance heating element, and a power supply control portion. The fixing member fixes a toner image transferred onto a sheet. The resistance heating element is used for heating the fixing member, and an electrical resistance thereof increases as a temperature increases. The power supply control portion gradually increases, when a heating timing of the fixing member arrives, input power to be input to the resistance heating element toward a predetermined upper limit value.

An image forming apparatus according to another aspect of the present disclosure forms an image using the fixing device. Further, the power supply control portion gradually increases the input power toward the upper limit value when a voltage of a commercial power source connected to the image forming apparatus is equal to or larger than a predetermined threshold value.

A power supply control method according to another aspect of the present disclosure is executed in a fixing device including a fixing member which fixes a toner image transferred onto a sheet, and a resistance heating element which is used for heating the fixing member and in which an electrical resistance increases as a temperature increases, the power supply control method including a determination step and a power supply control step. The determination step includes determining whether a heating timing of the fixing member has arrived. The power supply control step includes gradually increasing, when it is judged by the determination step that the heating timing has arrived, input power to be input to the resistance heating element toward a predetermined upper limit value.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the attached drawings. It is noted that the following embodiment is an embodied example of the present disclosure and does not limit the technical scope of the present disclosure.

[Configuration of Image Forming Apparatus 100]

First, a configuration of an image forming apparatus 100 according to an embodiment of the present disclosure will be described with reference to FIG. 1 and FIG. 2. Here, FIG. 1 is a cross-sectional diagram showing the configuration of the image forming apparatus 100.

It is noted that for convenience of descriptions, a vertical direction in a state where the image forming apparatus 100 is installed in a usable state (state shown in FIG. 1) is defined as an up-down direction D1. In addition, a front-rear direction D2 is defined with a left side surface of the image forming apparatus 100 shown in FIG. 1 being a front surface (front side). In addition, a left-right direction D3 is defined using the front surface of the image forming apparatus 100 in the installed state as a reference.

The image forming apparatus 100 is a printer having a printing function for forming an image based on image data. It is noted that the present disclosure is applicable to a facsimile apparatus, a copying machine, a multifunction peripheral, or the like which forms an image using electrophotography.

Figure 1:
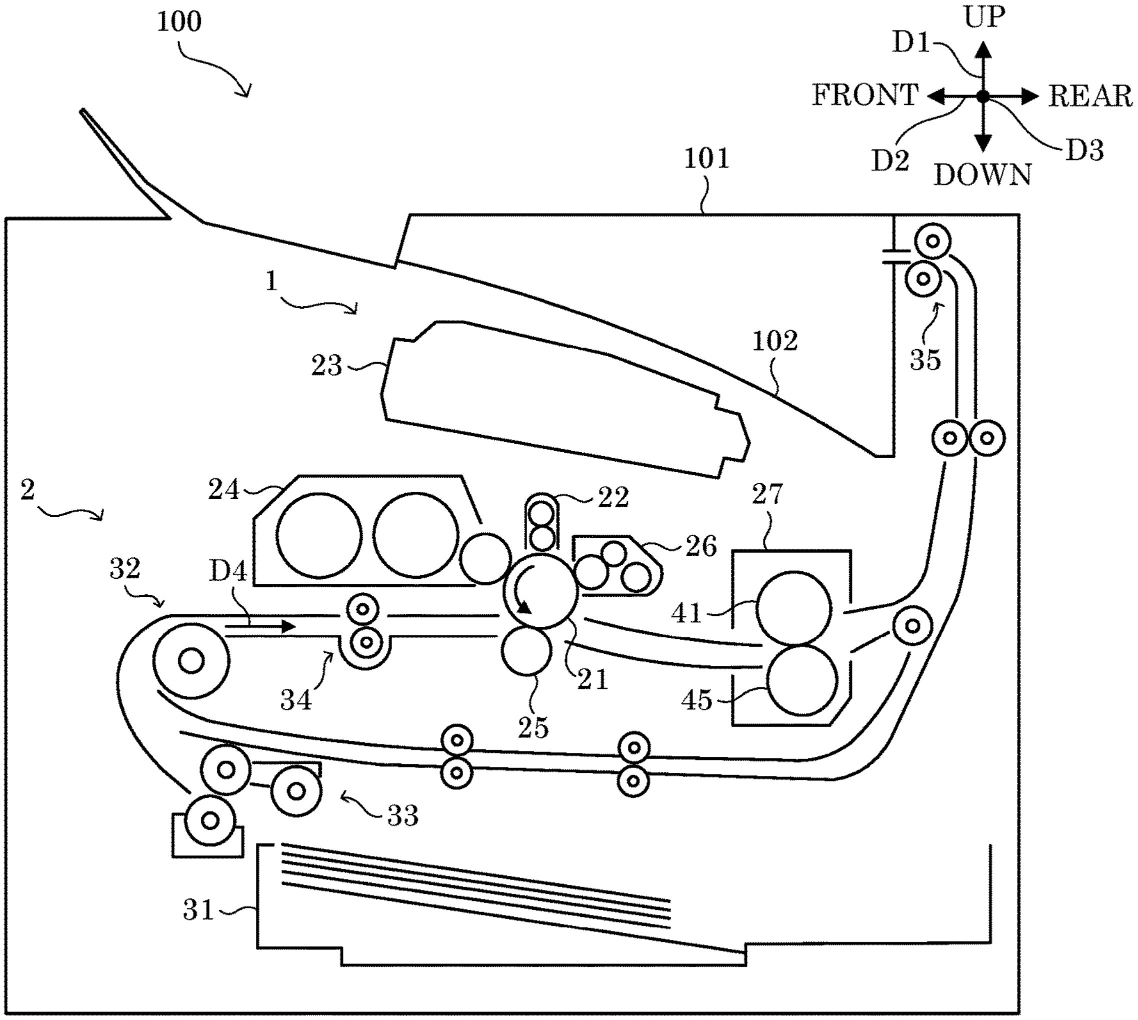
FIG. 1 is a diagram showing a configuration of an image forming apparatus according to an embodiment of the present disclosure.
Figure 2:
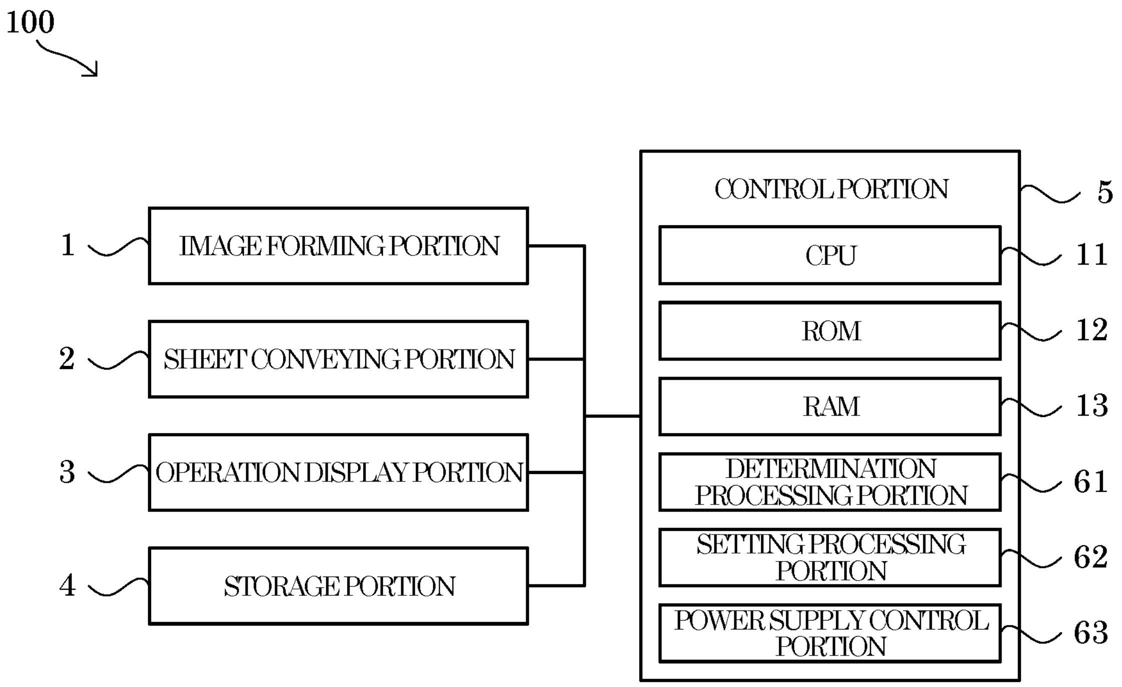
FIG. 2 is a diagram showing a system configuration of the image forming apparatus according to the embodiment of the present disclosure.

As shown in FIG. 1 and FIG. 2, the image forming apparatus 100 includes an image forming portion 1, a sheet conveying portion 2, an operation display portion 3, a storage portion 4, and a control portion 5. The image forming portion 1, the sheet conveying portion 2, the storage portion 4, and the control portion 5 are housed in a housing 101 (see FIG. 1) of the image forming apparatus 100. The housing 101 is formed in a substantially rectangular parallelepiped shape. The operation display portion 3 and a sheet reception portion 102 (see FIG. 1) to which a sheet formed with an image by the image forming apparatus 100 is discharged are formed above the housing 101.

The operation display portion 3 is a user interface of the image forming apparatus 100. The operation display portion 3 includes a display portion such as a liquid crystal display that displays various types of information in response to control instructions from the control portion 5, and an operation portion such as operation keys or a touch panel for inputting various types of information to the control portion 5 according to a user operation.

The storage portion 4 is a nonvolatile storage device. For example, the storage portion 4 is a nonvolatile memory such as a flash memory.

The control portion 5 collectively controls the image forming apparatus 100. As shown in FIG. 2, the control portion 5 includes a CPU 11, a ROM 12, and a RAM 13. The CPU 11 is a processor which executes various types of calculation processing. The ROM 12 is a nonvolatile storage device in which information such as control programs for causing the CPU 11 to execute various types of processing is stored in advance. The RAM 13 is a volatile or nonvolatile storage device which is used as a temporary storage memory (working area) for the various types of processing executed by the CPU 11. In the control portion 5, the various control programs stored in advance in the ROM 12 are executed by the CPU 11. Thus, the control portion 5 collectively controls the image forming apparatus 100. It is noted that the control portion 5 may be constituted by an electronic circuit such as an integrated circuit (ASIC). Alternatively, the control portion 5 may be a control portion provided separate from a main control portion which collectively controls the image forming apparatus 100.

The image forming portion 1 is capable of forming an image on a sheet using electrophotography based on image data input from an external information processing apparatus such as a personal computer. As shown in FIG. 1, the image forming portion 1 includes a photoconductor drum 21, a charging device 22, a laser scanning unit 23, a developing device 24, a transfer roller 25, a cleaning device 26, and a fixing device 27.

The photoconductor drum 21 is rotatably supported by the housing 101. Upon receiving a rotational driving force transmitted from a motor (not shown), the photoconductor drum 21 rotates in a direction indicated by an arrow in FIG. 1.

The charging device 22 charges a surface of the photoconductor drum 21.

The laser scanning unit 23 irradiates light that is based on image data onto the surface of the photoconductor drum 21 that has been charged by the charging device 22. By the laser scanning unit 23, an electrostatic latent image is formed on the surface of the photoconductor drum 21.

The developing device 24 develops the electrostatic latent image formed on the surface of the photoconductor drum 21 using developer including toner. By the developing device 24, a toner image is formed on the surface of the photoconductor drum 21.

The transfer roller 25 transfers the toner image formed on the surface of the photoconductor drum 21 onto a sheet conveyed toward the fixing device 27 by the sheet conveying portion 2.

The cleaning device 26 cleans the surface of the photoconductor drum 21 after the toner image is transferred by the transfer roller 25.

The fixing device 27 heats the sheet onto which the toner image has been transferred, and fixes the toner image onto the sheet.

The sheet conveying portion 2 conveys a sheet on which an image is to be formed by the image forming portion 1. As shown in FIG. 1, the sheet conveying portion 2 includes a sheet feed cassette 31, a sheet conveying path 32, a sheet feed unit 33, a registration roller pair 34, and a discharge roller pair 35.

The sheet feed cassette 31 stores sheets onto which images are to be formed by the image forming portion 1. As shown in FIG. 1, the sheet feed cassette 31 is provided at a bottom of the housing 101. For example, the sheet feed cassette 31 stores a sheet member such as a paper, a coated paper, a postcard, an envelope, and an OHP sheet. The sheet feed cassette 31 includes a lifting plate for lifting a plurality of sheets stored inside.

The sheet conveying path 32 is a movement path of a sheet from the sheet feed cassette 31 to the sheet reception portion 102 via the transfer roller 25 and the fixing device 27. The sheet conveying path 32 is provided with a plurality of roller pairs including the registration roller pair 34 and the discharge roller pair 35. On the sheet conveying path 32, a sheet fed from the sheet feed cassette 31 is conveyed by the plurality of roller pairs in a conveying direction D4 (see FIG. 1) directed toward the sheet reception portion 102. The sheet conveying path 32 is formed by a pair of conveyance guide members provided in the housing 101.

The sheet feed unit 33 feeds the sheets stored in the sheet feed cassette 31 one by one to the sheet conveying path 32. The sheet feed unit 33 includes a pickup roller, a sheet feed roller, and a retard roller. Of the plurality of sheets lifted by the lifting plate of the sheet feed cassette 31, the pickup roller comes into contact with an upper surface of an uppermost sheet and rotates, to feed the sheet to the sheet feed roller. The sheet feed roller comes into contact with the upper surface of the sheet fed by the pickup roller and rotates, to feed the sheet to the sheet conveying path 32. The retard roller is provided while being biased from a lower side of the sheet feed roller toward the sheet feed roller. When a plurality of overlapping sheets are fed by the pickup roller, the retard roller separates sheets other than the uppermost sheet from the plurality of overlapping sheets.

In accordance with a timing at which a toner image formed on the surface of the photoconductor drum 21 is conveyed, by a rotation of the photoconductor drum 21, to a transfer position by the transfer roller 25, the registration roller pair 34 conveys the sheet to the transfer position.

The discharge roller pair 35 discharges the sheet onto which the toner image has been fixed by the fixing device 27, to the sheet reception portion 102.

[Configuration of Fixing Device 27]

Figure 3:
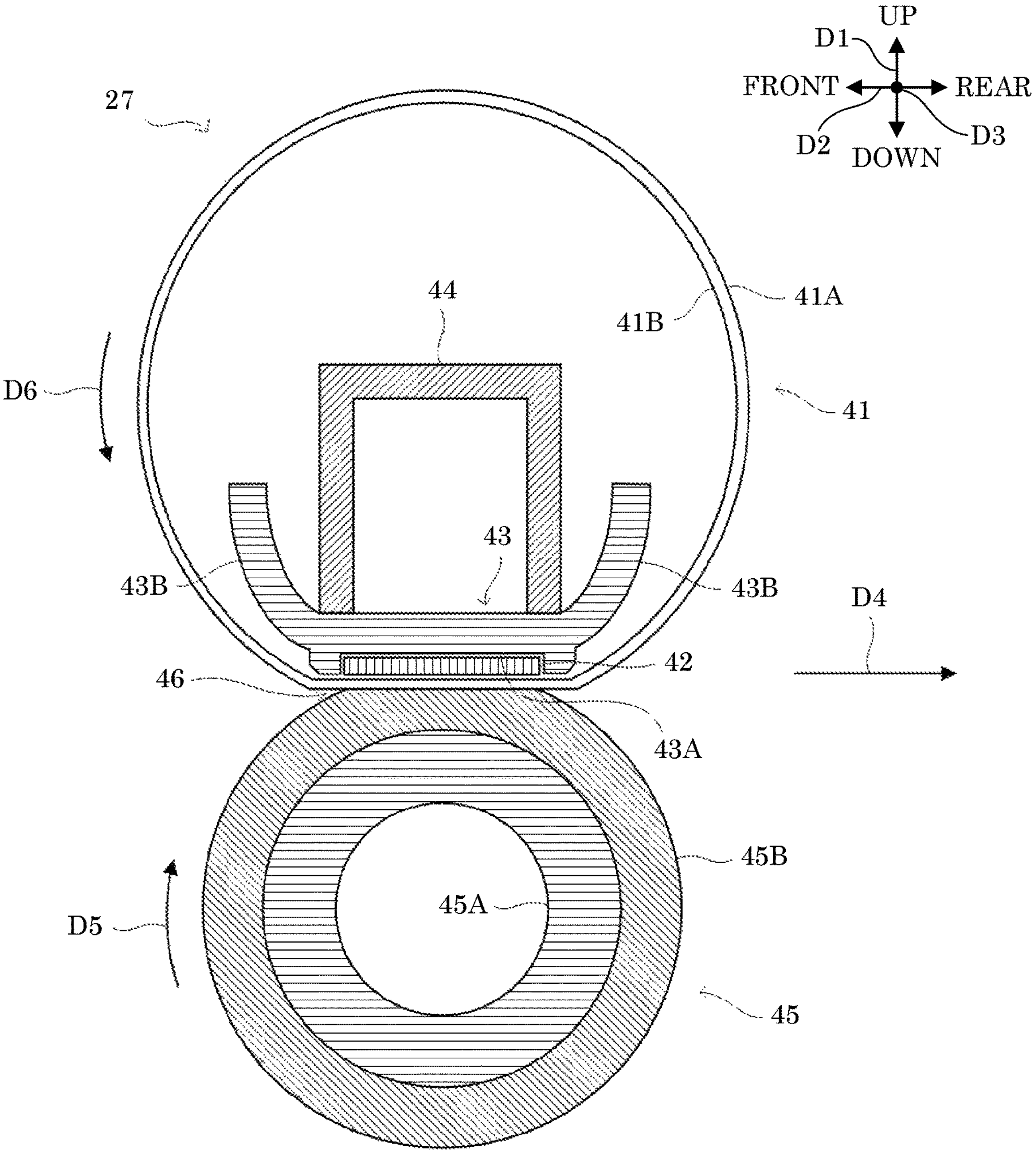
FIG. 3 is a diagram showing a configuration of a fixing device of the image forming apparatus according to the embodiment of the present disclosure.
Figure 4:
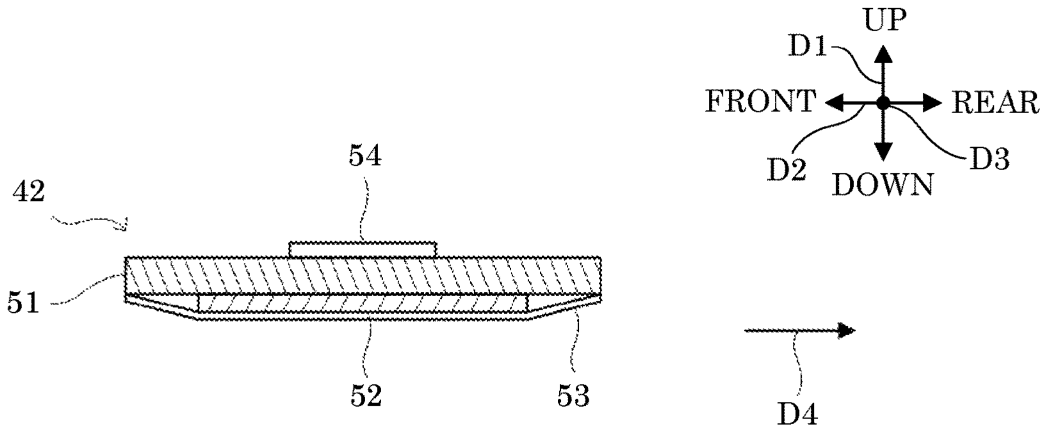
FIG. 4 is a diagram showing a configuration of a heating portion of the image forming apparatus according to the embodiment of the present disclosure.

Next, a configuration of the fixing device 27 will be described with reference to FIG. 3 and FIG. 4. Here, FIG. 3 is a cross-sectional diagram showing the configuration of the fixing device 27. In addition, FIG. 4 is a cross-sectional diagram showing a configuration of a heating portion 42.

As shown in FIG. 3, the fixing device 27 includes a fixing belt 41, the heating portion 42, a supporting portion 43, a pressing member 44, and a pressure roller 45.

The fixing belt 41 is heated by the heating portion 42 to a predetermined fixing temperature. By being brought into contact with a sheet in a heated state, the fixing belt 41 fixes the toner image transferred onto the sheet, onto the sheet. As shown in FIG. 3, the fixing belt 41 is an endless belt. Moreover, the fixing belt 41 has flexibility. The fixing belt 41 includes a base material layer, an elastic layer provided on an outer circumferential surface of the base material layer, and a release layer provided on an outer circumferential surface of the elastic layer. The base material layer is formed of a metal material such as stainless steel and a nickel alloy. The elastic layer is formed of a material such as silicon rubber. The release layer is formed of a fluorine resin material such as PFA (tetrafluoroethylene/perfluoroalkoxy-ethylene copolymer resin). The fixing belt 41 is elongated along the left-right direction D3. A size of the fixing belt 41 in the left-right direction D3 is determined based on a maximum size of a sheet on which the image forming apparatus 100 is capable of forming an image. The fixing belt 41 is an example of a fixing member of the present disclosure.

The pressure roller 45 is provided at a position at which the pressure roller 45 is capable of coming into contact with an outer circumferential surface 41A (see FIG. 3) of the fixing belt 41. Specifically, as shown in FIG. 3, the pressure roller 45 is provided below the fixing belt 41. The pressure roller 45 is elongated along the left-right direction D3. The pressure roller 45 includes a shaft portion 45A and an elastic layer 45B. The shaft portion 45A is formed in a cylindrical shape by a metal material. The elastic layer 45B is formed on an outer circumference of the shaft portion 45A by a material having elasticity. The shaft portion 45A is rotatably supported by a pair of side plates provided inside the housing 101. The pressure roller 45 rotates in a rotating direction D5 (see FIG. 3) upon receiving a rotational driving force supplied from a motor (not shown).

The heating portion 42 heats the fixing belt 41. As shown in FIG. 3, the heating portion 42 is provided on an inner side of an inner circumferential surface 41B (see FIG. 3) of the fixing belt 41 at a position opposing the pressure roller 45 with the fixing belt 41 interposed therebetween. The heating portion 42 is elongated in the left-right direction D3 and extends toward both outer sides of the fixing belt 41 in the left-right direction D3.

As shown in FIG. 4, the heating portion 42 includes a substrate 51, a resistance heating element 52, a protective layer 53, and a temperature sensor 54.

The substrate 51 is a plate-like member elongated in the left-right direction D3. The substrate 51 is formed of a material having excellent heat resistance, electrical insulation property, and low heat capacity. For example, the substrate 51 is formed of ceramic such as alumina. A size of the substrate 51 in the left-right direction D3 is larger than that of the fixing belt 41. The substrate 51 is disposed so as to extend toward both the outer sides of the fixing belt 41 in the left-right direction D3. Therefore, both end portions of the substrate 51 in the left-right direction D3 protrude outwardly from the fixing belt 41 in the left-right direction D3.

As shown in FIG. 3 and FIG. 4, a lower surface of the substrate 51 opposes the inner circumferential surface 41B of the fixing belt 41. As shown in FIG. 4, the resistance heating element 52 is disposed on the lower surface of the substrate 51. Moreover, an opposing area on the lower surface of the substrate 51, which opposes the inner circumferential surface 41B of the fixing belt 41, is covered by the protective layer 53 (see FIG. 4). The protective layer 53 is formed of a material having an electrical insulation property, such as glass.

As shown in FIG. 3 and FIG. 4, an upper surface of the substrate 51 opposes a bottom surface of a concave portion 43A of the supporting portion 43. As shown in FIG. 4, a temperature sensor 54 is disposed on the upper surface of the substrate 51. The temperature sensor 54 senses a temperature of the resistance heating element 52 and outputs an electrical signal corresponding to the sensed temperature. The electrical signal output from the temperature sensor 54 is input to the control portion 5. Based on the electrical signal input from the temperature sensor 54, the control portion 5 controls power supply to the resistance heating element 52. The temperature sensor 54 is an example of a temperature sensing portion of the present disclosure.

The resistance heating element 52 is used for heating the fixing belt 41. The resistance heating element 52 generates heat according to power supply from a commercial power source 200 (see FIG. 5). The resistance heating element 52 has PTC (Positive Temperature Coefficient) characteristics with which an electrical resistance increases as a temperature increases. The resistance heating element 52 is formed of a material having the PTC characteristics and is formed in a strip shape that is elongated in the left-right direction D3 and has a predetermined thickness in a direction orthogonal to the lower surface of the substrate 51. A size of the resistance heating element 52 in the left-right direction D3 is smaller than that of the fixing belt 41. The resistance heating element 52 is disposed on an inner side of the opposing area on the lower surface of the substrate 51.

The supporting portion 43 supports the heating portion 42. As shown in FIG. 3, the supporting portion 43 is provided on an inner side of the inner circumferential surface 41B of the fixing belt 41. The supporting portion 43 is elongated in the left-right direction D3 and extends toward both the outer sides of the fixing belt 41 in the left-right direction D3. The concave portion 43A corresponding to the shape of the heating portion 42 is formed at a bottom of the supporting portion 43. The heating portion 42 fits into the concave portion 43A.

The pressing member 44 presses the supporting portion 43 toward the pressure roller 45 side. As shown in FIG. 3, the pressing member 44 is provided on the inner side of the inner circumferential surface 41B of the fixing belt 41 at a position opposing the pressure roller 45 with the supporting portion 43 interposed therebetween. The pressing member 44 is elongated in the left-right direction D3 and extends toward both the outer sides of the fixing belt 41 in the left-right direction D3. Both end portions of the pressing member 44 in the left-right direction D3 are biased toward the pressure roller 45 side by a bias member (not shown). Thus, the pressing member 44 presses the supporting portion 43 toward the pressure roller 45 side. By the supporting portion 43 being pressed toward the pressure roller 45 side, the heating portion 42 supported by the supporting portion 43 is pressed toward the pressure roller 45 side.

By being pressed toward the pressure roller 45 side by the pressing member 44, the heating portion 42 comes into press contact with the inner circumferential surface 41B of the fixing belt 41. Thus, a fixing nip portion 46 for fixing a toner image transferred onto a sheet, is formed between the fixing belt 41 and the pressure roller 45. In the present specification, an area where the fixing belt 41 and the pressure roller 45 come into contact with each other is defined as the fixing nip portion 46. It is noted that a lubricant such as fluorine grease is applied between the heating portion 42 and the inner circumferential surface 41B of the fixing belt 41.

The fixing belt 41 is sandwiched between the heating portion 42 and the pressure roller 45. As the pressure roller 45 rotates in the rotating direction D5, the fixing belt 41 also rotates along a belt rotating direction D6 (see FIG. 3) by being driven by the rotation of the pressure roller 45.

The supporting portion 43 includes a pair of guide portions 43B that come into contact with the inner circumferential surface 41B of the fixing belt 41 to guide traveling of the fixing belt 41. The pair of guide portions 43B are respectively provided at both end portions of the supporting portion 43 in the front-rear direction D2. The fixing belt 41 is guided by the pair of guide portions 43B to travel along a predetermined traveling path.

It is noted that the pressure roller 45 may alternatively be biased toward the heating portion 42 side. In this case, the pressing member 44 does not need to be biased by the bias member.

Incidentally, in a conventional fixing device including the resistance heating element 52, a large current may flow at a time of a start of heating of the fixing belt 41 due to a small electrical resistance of the resistance heating element 52 in a case where the resistance heating element 52 is at room temperature. In contrast, a fixing device which heats the resistance heating element 52 before power supply to the resistance heating element 52 is started is known as a related art.

In the fixing device according to the related art described above, however, a configuration for heating the resistance heating element 52 needs to be provided separate from the resistance heating element 52, and thus the configuration of the device becomes complicated.

In contrast, as will be described below, in the image forming apparatus 100 according to the embodiment of the present disclosure, it is possible to suppress a current that flows at a time of a start of heating of the fixing belt 41 without complicating the configuration.

[Configuration of Control Portion 5]

Figure 5:
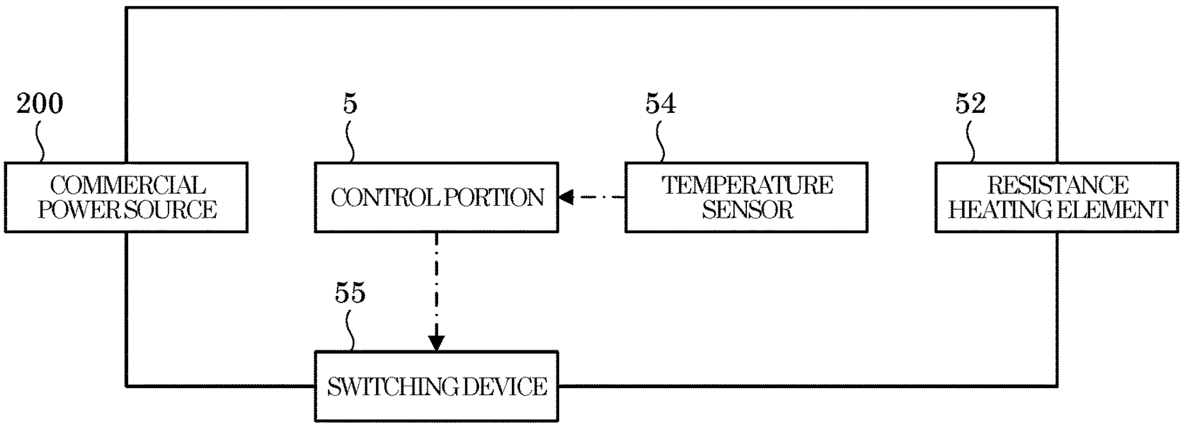
FIG. 5 is a diagram showing a configuration of a power supply path of a resistance heating element in the image forming apparatus according to the embodiment of the present disclosure.

Hereinafter, a configuration of the control portion 5 will be described with reference to FIG. 2 and FIG. 5. Here, FIG. 5 is a diagram showing a configuration of a power supply path of the resistance heating element 52. It is noted that in FIG. 5, an electrical signal output from the temperature sensor 54 and an electrical signal output from the control portion 5 are each indicated by a dash-dot-dash line with an arrow.

As shown in FIG. 2, the control portion 5 includes a determination processing portion 61, a setting processing portion 62, and a power supply control portion 63.

Specifically, a power supply control program for causing the CPU 11 to function as the respective portions described above is stored in advance in the ROM 12 of the control portion 5. Then, the CPU 11 executes the power supply control program stored in the ROM 12 to thus function as the determination processing portion 61, the setting processing portion 62, and the power supply control portion 63. A device including the fixing device 27 and the control portion 5 is an example of the fixing device of the present disclosure.

It is noted that the power supply control program may be recorded onto a computer-readable recording medium such as a CD, a DVD, and a flash memory, and may be read from the recording medium to be stored in the storage portion 4. In addition, the determination processing portion 61, the setting processing portion 62, and the power supply control portion 63 may be constituted by an electronic circuit such as an integrated circuit (ASIC).

The determination processing portion 61 determines whether a voltage of the commercial power source 200 (see FIG. 5) connected to the image forming apparatus 100 is equal to or larger than a predetermined threshold value.

Specifically, the determination processing portion 61 determines whether the voltage of the commercial power source 200 is equal to or larger than the threshold value based on a destination of the image forming apparatus 100. Herein, the destination refers to a country or region to/in which the image forming apparatus 100 is shipped, sold, or used.

For example, the threshold value is a product of a first resistance value indicating an electrical resistance of the resistance heating element 52 in a case where the resistance heating element 52 is at a predetermined reference temperature, and a reference current value that has been predetermined as an upper limit value of a current that flows via the resistance heating element 52. The reference temperature is preset within a range of an environment temperature (ambient temperature) in which the image forming apparatus 100 can be operated normally. For example, the reference temperature is 20° C. The reference current value is set based on a difference between a rated current of the image forming apparatus 100 and a sum of currents that flow in a configuration different from the resistance heating element 52 at the time of the start of heating of the fixing belt 41. For example, the rated current of the image forming apparatus 100 is 10 A (ampere). In addition, the sum of currents that flow in the configuration different from the resistance heating element 52 at the time of the start of heating of the fixing belt 41 is 1 A (ampere). In addition, the reference current value is 9 A (ampere).

For example, in the image forming apparatus 100, destination information indicating the destination is stored in advance in the ROM 12 of the control portion 5. The destination information is used in a language setting, a print condition setting, a standard sheet size setting, and the like of the image forming apparatus 100. Also in the image forming apparatus 100, first table data indicating a correspondence relationship between the destination and the voltage of the commercial power source 200 is stored in advance in the storage portion 4.

The determination processing portion 61 acquires the voltage of the commercial power source 200 based on the destination information read out from the ROM 12 and the first table data read out from the storage portion 4. Then, the determination processing portion 61 compares the acquired voltage of the commercial power source 200 and the threshold value, to determine whether the voltage of the commercial power source 200 is equal to or larger than the threshold value.

It is noted that the threshold value may be corrected based on a difference between an actual environment temperature at an installation location of the image forming apparatus 100 and the reference temperature. For example, the control portion 5 only needs to correct the first resistance value based on a difference between an internal temperature of the housing 101 sensed by a temperature sensor (not shown) and the reference temperature, and calculate the threshold value using the corrected first resistance value.

Further, the threshold value may be predetermined for each of the destinations. In this case, the determination processing portion 61 only needs to select any one of a plurality of threshold values respectively corresponding to the plurality of destinations based on the destination information read out from the ROM 12, and compare the selected threshold value with the voltage of the commercial power source 200.

Furthermore, the destination may be designated by a user during an initial setting of the image forming apparatus 100. In this case, the control portion 5 only needs to store destination information indicating the destination designated by the user in a non-rewritable storage device such as an OTP (One Time Programmable) memory. In addition, the determination processing portion 61 only needs to read out the destination information from the non-rewritable storage device.

Further, the image forming apparatus 100 may include a voltmeter capable of measuring the voltage of the commercial power source 200. In this case, the determination processing portion 61 only needs to determine whether the voltage of the commercial power source 200 is equal to or larger than the threshold value based on a measurement result of the voltmeter.

The setting processing portion 62 sets an upper limit value of input power to be input to the resistance heating element 52 based on the voltage of the commercial power source 200.

For example, in the image forming apparatus 100, a second resistance value indicating an electrical resistance of the resistance heating element 52 in a case where the resistance heating element 52 is at the fixing temperature is stored in advance in the ROM 12.

Based on the second resistance value read out from the ROM 12 and the voltage of the commercial power source 200, the setting processing portion 62 calculates a current that flows via the resistance heating element 52 at a timing at which the temperature of the resistance heating element 52 has increased to the fixing temperature by the power supply to the resistance heating element 52. Then, when the calculated current exceeds the reference current value, the setting processing portion 62 sets the upper limit value of the input power based on the reference current value. Specifically, the setting processing portion 62 sets a product of the reference current value and the voltage of the commercial power source 200 as the upper limit value of the input power. On the other hand, when the calculated current is equal to or smaller than the reference current value, the setting processing portion 62 sets the upper limit value of the input power based on the current. Specifically, the setting processing portion 62 sets a product of the calculated current and the voltage of the commercial power source 200 as the upper limit value of the input power.

When a heating timing of the fixing belt 41 arrives, the power supply control portion 63 gradually increases the input power to be input to the resistance heating element 52 toward the upper limit value of the input power set by the setting processing portion 62.

Specifically, when the determination processing portion 61 judges that the voltage of the commercial power source 200 (see FIG. 5) is equal to or larger than the threshold value, the power supply control portion 63 gradually increases the input power toward the upper limit value. In this case, power supply to the resistance heating element 52 is restricted, and that restriction is gradually relaxed. On the other hand, when the determination processing portion 61 judges that the voltage of the commercial power source 200 is smaller than the threshold value, the power supply control portion 63 inputs power corresponding to the upper limit value set by the setting processing portion 62 to the resistance heating element 52. In this case, power supply to the resistance heating element 52 is not restricted.

For example, the power supply control portion 63 controls the increase of the input power based on a result of the sensing of the temperature of the resistance heating element 52 by the temperature sensor 54.

Further, the power supply control portion 63 gradually increases the input power toward the upper limit value by PWM (Pulse Width Modulation) control.

For example, as shown in FIG. 5, a switching device 55 is provided on an energizing path between the commercial power source 200 and the resistance heating element 52.

The switching device 55 is a semiconductor switch capable of switching the energizing path between the commercial power source 200 and the resistance heating element 52 between connection and disconnection in accordance with an input of pulse signals of a preset duty ratio, that are output from the control portion 5. For example, the switching device 55 is a triac.

For example, the power supply control portion 63 executes first power supply control when the heating timing arrives and it is determined by the determination processing portion 61 that the voltage of the commercial power source 200 (see FIG. 5) is equal to or larger than the threshold value.

For example, in the first power supply control, pulse signals in a duty ratio of a predetermined first ratio are input to the switching device 55 from when the first power supply control is started to when the temperature of the resistance heating element 52 sensed by the temperature sensor 54 exceeds a predetermined first temperature. Also in the first power supply control, pulse signals in a duty ratio of a second ratio higher than the first ratio are input to the switching device 55 from a timing at which the temperature of the resistance heating element 52 sensed by the temperature sensor 54 has exceeded the first temperature to when the temperature exceeds the fixing temperature.

The second ratio is a ratio that is set based on the upper limit value of the input power set by the setting processing portion 62. The second ratio in a case where the current value calculated based on the second resistance value and the voltage of the commercial power source 200 is equal to or smaller than the reference current value is 100%. Moreover, the second ratio in a case where the current value calculated based on the second resistance value and the voltage of the commercial power source 200 is smaller than the reference current value is smaller than 100%.

The first ratio is set arbitrarily within a range in which the current that flows via the resistance heating element 52 does not exceed the reference current value.

Further, the power supply control portion 63 executes second power supply control when the heating timing arrives and it is determined by the determination processing portion 61 that the voltage of the commercial power source 200 (see FIG. 5) is smaller than the threshold value.

For example, in the second power supply control, pulse signals in the duty ratio of the second ratio are input to the switching device 55 from when the second power supply control is started to when the temperature of the resistance heating element 52 sensed by the temperature sensor 54 exceeds the fixing temperature.

Figure 7:
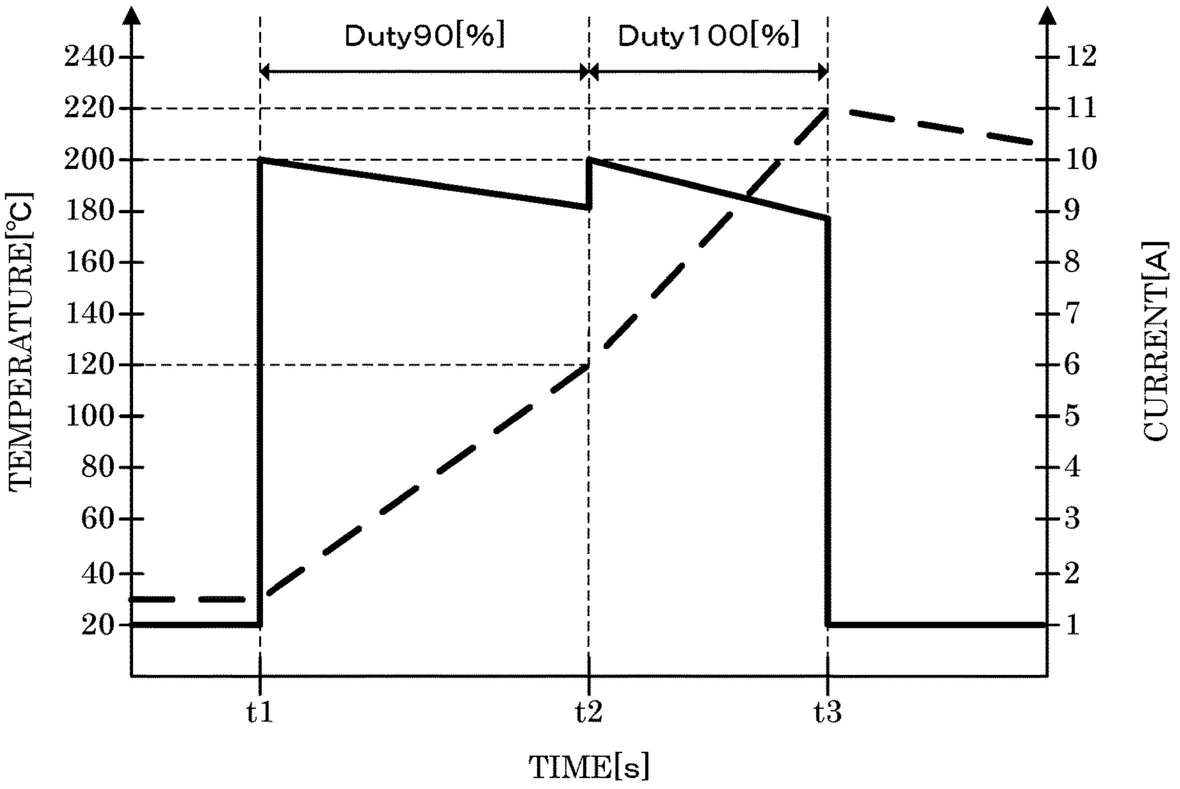
FIG. 7 is a diagram showing a current that flows at a time of a start of heating of a fixing belt in the image forming apparatus according to the embodiment of the present disclosure.

Herein, an example of the first power supply control will be described with reference to FIG. 7. FIG. 7 is a diagram showing a transition of a current that flows in a power cable which electrically connects the image forming apparatus 100 and the commercial power source 200 and a sensing temperature obtained by the temperature sensor 54 during an execution period of the first power supply control.

It is noted that a bold solid line in FIG. 7 indicates a transition of the current that flows in the power cable. In addition, a bold broken line in FIG. 7 indicates a transition of the sensing temperature obtained by the temperature sensor 54. Moreover, "t1" on a horizontal axis of FIG. 7 represents the heating timing. In addition, "t2" on the horizontal axis of FIG. 7 represents a timing at which the sensing temperature obtained by the temperature sensor 54 has reached 120° C. as an example of the first temperature. Moreover, "t3" on the horizontal axis of FIG. 7 represents a timing at which the sensing temperature obtained by the temperature sensor 54 has reached 220° C. as an example of the fixing temperature.

When the timing t1 arrives (see FIG. 7), the first power supply control is started. Specifically, pulse signals in a duty ratio of 90% as an example of the first ratio are input to the switching device 55. Thus, as shown in FIG. 7, the current that flows in the power cable increases from 1 A (ampere) to 10 A (ampere). In other words, a current of 9 A (ampere) flows in the resistance heating element 52. As a result, the resistance heating element 52 generates heat.

As the resistance heating element 52 generates heat according to the power supply, the temperature of the resistance heating element 52 increases by the generation of heat. Thus, the electrical resistance of the resistance heating element 52 having the PTC characteristics increases. Therefore, as shown in FIG. 7, from the timing t1 to the timing t2 (see FIG. 7), the temperature of the resistance heating element 52 gradually increases, and the current that flows in the power cable is gradually lowered.

When the timing t2 (see FIG. 7) arrives, the duty ratio of the pulse signals input to the switching device 55 is switched from 90% to 100% as an example of the second ratio. Thus, as shown in FIG. 7, the current that flows in the power cable increases to 10 A (ampere).

From the timing t2 to the timing t3 (see FIG. 7), the temperature of the resistance heating element 52 gradually increases, and the current that flows in the power cable is gradually lowered.

When the timing t3 arrives, the first power supply control is ended, and the power supply to the resistance heating element 52 is stopped. Thus, the current that flows in the power cable is lowered to 1 A (ampere) which is a value obtained before the start of the first power supply control.

Figure 8:
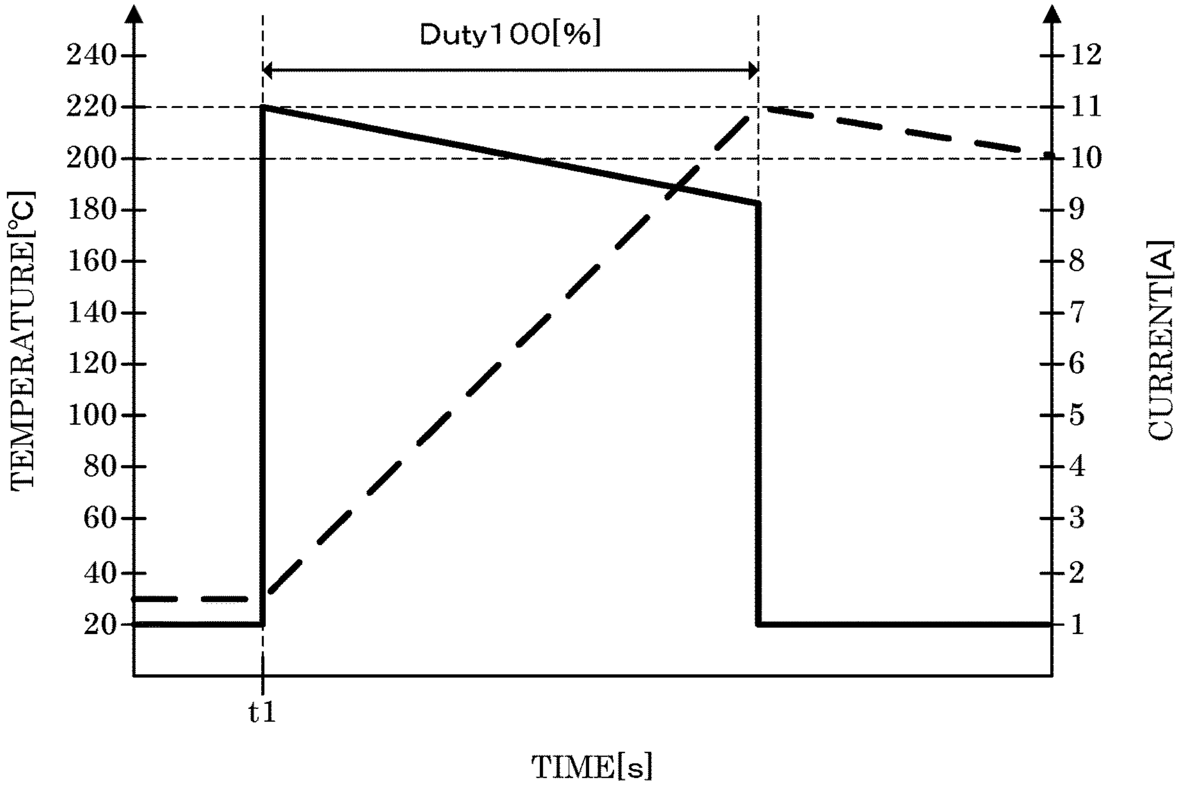
FIG. 8 is a diagram showing a current that flows at the time of the start of heating of the fixing belt in the image forming apparatus according to the embodiment of the present disclosure.

FIG. 8 shows a transition of the current that flows in the power cable and the sensing temperature obtained by the temperature sensor 54 in a case where the second power supply control is executed in place of the first power supply control.

As shown in FIG. 8, when the second power supply control is executed in place of the first power supply control, the current that flows in the power cable increases from 1 A (ampere) to 11 A (ampere) at the timing t1. In other words, in the case where the second power supply control is executed at the timing t1, the current that flows in the power cable increases more than in the case where the first power supply control is executed at the timing t1. This indicates that, by executing the first power supply control in place of the second power supply control, the current that flows in the power cable can be suppressed.

It is noted that in the first power supply control, the input power may be increased stepwise by 3 or more steps.

Further, the power supply control portion 63 may control the increase of the input power using a sensor provided separate from the temperature sensor 54. For example, the power supply control portion 63 may control the increase of the input power using a sensor that is provided opposed to the outer circumferential surface 41A of the fixing belt 41 and senses a temperature of the fixing belt 41. In this case, the heating portion 42 does not need to include the temperature sensor 54.

Alternatively, the power supply control portion 63 may control the increase of the input power based on a time that has elapsed since the heating timing. Specifically, the power supply control portion 63 only needs to increase the input power as the time that has elapsed since the heating timing increases. In this case, the heating portion 42 does not need to include the temperature sensor 54.

In addition, the power supply control portion 63 may gradually increase the input power toward the upper limit value irrespective of the PWM control. For example, a configuration in which a first path that passes through a resistance element and a second path that does not pass through the resistance element are provided between the commercial power source 200 and the resistance heating element 52 is conceivable. In this configuration, the power supply control portion 63 only needs to switch the energizing path used for the power supply to the resistance heating element 52 from the first path to the second path in accordance with an increase of the sensing temperature obtained by the temperature sensor 54.

Moreover, the power supply control portion 63 may constantly execute the first power supply control irrespective of the result of the determination by the determination processing portion 61. In this case, the control portion 5 does not need to include the determination processing portion 61.

Further, the control portion 5 does not need to include the setting processing portion 62. In this case, the power supply control portion 63 only needs to gradually increase the input power toward a predetermined upper limit value of the input power when the heating timing arrives.

[Power Supply Control Processing]

Figure 6:
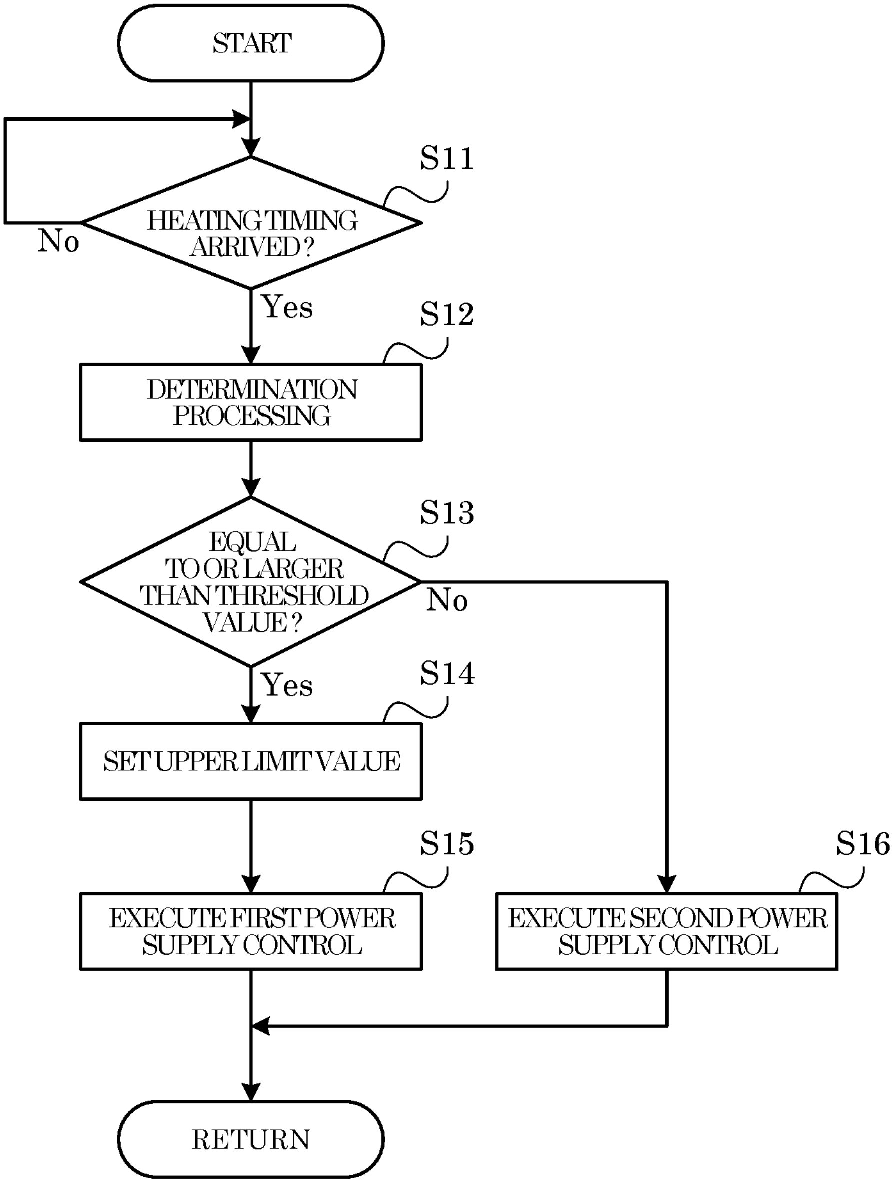
FIG. 6 is a flowchart showing an example of power supply control processing executed in the image forming apparatus according to the embodiment of the present disclosure.

Hereinafter, with reference to FIG. 6, a power supply control method of the present disclosure will be described along with an example of procedures of the power supply control processing executed by the control portion 5 in the image forming apparatus 100. Herein, Steps S11, S12 . . . respectively represent numbers of processing procedures (steps) executed by the control portion 5.

<Step S11>

First, in Step S11, the control portion 5 determines whether the heating timing has arrived. Herein, the processing of Step S11 is an example of a determination step of the present disclosure and is executed by the power supply control portion 63 of the control portion 5.

For example, the control portion 5 determines that the heating timing has arrived when an execution instruction of image forming processing for forming an image using the image forming portion 1 is input.

Herein, when determining that the heating timing has arrived (Yes side in Step S11), the control portion 5 advances to processing of Step S12. On the other hand, when determining that the heating timing has not arrived (No side in Step S11), the control portion 5 waits for the arrival of the heating timing in Step S11.

<Step S12>

In Step S12, the control portion 5 executes determination processing to determine whether the voltage of the commercial power source 200 is equal to or larger than the threshold value. Herein, the processing of Step S12 is executed by the determination processing portion 61 of the control portion 5.

<Step S13>

In Step S13, the control portion 5 causes the processing to branch based on a result of the determination processing.

Specifically, when it is determined by the determination processing that the voltage of the commercial power source 200 is equal to or larger than the threshold value (Yes side in Step S13), the control portion 5 advances to processing of Step S14. On the other hand, when it is determined by the determination processing that the voltage of the commercial power source 200 is smaller than the threshold value (No side in Step S13), the control portion 5 advances to processing of Step S16.

<Step S14>

In Step S14, the control portion 5 sets an upper limit value of the input power to be input to the resistance heating element 52. Herein, the processing of Step S14 is executed by the setting processing portion 62 of the control portion 5.

<Step S15>

In Step S15, the control portion 5 executes the first power supply control. Herein, the processing of Step S15 is an example of a power supply control step of the present disclosure and is executed by the power supply control portion 63 of the control portion 5.

<Step S16>

In Step S16, the control portion 5 executes the second power supply control. Herein, the processing of Step S16 is executed by the power supply control portion 63 of the control portion 5.

In this manner, in the image forming apparatus 100, when the heating timing arrives, the input power is gradually increased toward the preset upper limit value. Thus, the current that flows at a time of a start of heating of the fixing belt 41 can be suppressed without complicating the configuration.

[Notes of Disclosure]

Hereinafter, an overview of the disclosure extracted from the embodiment described above will be noted. It is noted that the respective configurations and respective processing functions described in the notes below can be sorted and combined arbitrarily.

<Note 1>

A fixing device, including: a fixing member which fixes a toner image transferred onto a sheet, onto the sheet; a resistance heating element which is used for heating the fixing member and in which an electrical resistance increases as a temperature increases; and a power supply control portion which gradually increases, when a heating timing of the fixing member arrives, input power to be input to the resistance heating element toward a predetermined upper limit value.

<Note 2>

The fixing device according to Note 1, further including: a temperature sensing portion which senses a temperature of the resistance heating element, in which the power supply control portion controls an increase of the input power based on a result of the sensing by the temperature sensing portion.

<Note 3>

The fixing device according to Note 1 or 2, in which the power supply control portion gradually increases the input power toward the upper limit value by PWM control.

<Note 4>

An image forming apparatus for forming an image using the fixing device according to any one of Notes 1 to 3, including: a determination processing portion which determines whether a voltage of a commercial power source connected to the image forming apparatus is equal to or larger than a predetermined threshold value, in which the power supply control portion gradually increases the input power toward the upper limit value when the determination processing portion determines that the voltage of the commercial power source is equal to or larger than the threshold value.

<Note 5>

The image forming apparatus according to Note 4, in which the determination processing portion determines whether the voltage of the commercial power source is equal to or larger than the threshold value based on a destination of the image forming apparatus.

<Note 6>

The image forming apparatus according to Note 4 or 5, further including: a setting processing portion which sets the upper limit value based on the voltage of the commercial power source.

<Note 7>

A power supply control method executed in a fixing device including a fixing member which fixes a toner image transferred onto a sheet, onto the sheet, and a resistance heating element which is used for heating the fixing member and in which an electrical resistance increases as a temperature increases, the power supply control method including: a determination step of determining whether a heating timing of the fixing member has arrived; and a power supply control step of gradually increasing, when it is judged by the determination step that the heating timing has arrived, input power to be input to the resistance heating element toward a predetermined upper limit value.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:

a fixing device including:
- a fixing member which fixes a toner image transferred onto a sheet; and
- a resistance heating element which is used for heating the fixing member and in which an electrical resistance increases as a temperature increases;

a determination processing portion which determines whether a voltage of a commercial power source connected to the image forming apparatus is equal to or larger than a predetermined threshold value; and a power supply control portion which gradually increases, when a heating timing of the fixing member arrives and the voltage of the commercial power source is equal to or larger than the threshold value, input power to be input to the resistance heating element toward a predetermined upper limit value, wherein the determination processing portion determines whether the voltage of the commercial power source is equal to or larger than the threshold value based on a destination of the image forming apparatus.

2. The fixing device according to claim 1, further comprising:

a temperature sensing portion which senses a temperature of the resistance heating element, wherein the power supply control portion controls an increase of the input power based on a result of the sensing by the temperature sensing portion.

3. The fixing device according to claim 1, wherein the power supply control portion gradually increases the input power toward the upper limit value by PWM control.

4. The image forming apparatus according to claim 1, further comprising:

a setting processing portion which sets the upper limit value based on the voltage of the commercial power source.

5. A power supply control method executed in a fixing device of an image forming apparatus, the fixing device including a fixing member which fixes a toner image transferred onto a sheet, and a resistance heating element which is used for heating the fixing member and in which an electrical resistance increases as a temperature increases, the power supply control method comprising:

a first determination step of determining whether a heating timing of the fixing member has arrived;

a second determination step of determining whether a voltage of a commercial power source connected to the image forming apparatus is equal to or larger than a predetermined threshold value; and a power supply control step of gradually increasing, when it is judged that the heating timing has arrived and the voltage of the commercial power source is equal to or larger than the threshold value, input power to be input to the resistance heating element toward a predetermined upper limit value, wherein determining whether the voltage of the commercial power source is equal to or larger than the threshold value is based on a destination of the image forming apparatus.

6. An image forming apparatus, comprising:

a fixing device including:

a fixing member which fixes a toner image transferred onto a sheet; and a resistance heating element which is used for heating the fixing member and in which an electrical resistance increases as a temperature increases;

a determination processing portion which determines whether a voltage of a commercial power source connected to the image forming apparatus is equal to or larger than a predetermined threshold value;

a power supply control portion which gradually increases, when a heating timing of the fixing member arrives and the voltage of the commercial power source is equal to or larger than the threshold value, input power to be input to the resistance heating element toward a predetermined upper limit value; and a setting processing portion which sets the upper limit value based on the voltage of the commercial power source.

* * * * *